US012182557B2

(12) United States Patent
Pachpande et al.

(10) Patent No.: US 12,182,557 B2
(45) Date of Patent: Dec. 31, 2024

(54) METHODS AND SYSTEMS FOR AUTOMATING COMPUTER APPLICATION TASKS USING APPLICATION GUIDES, MARKUPS AND COMPUTER VISION

(71) Applicant: EdCast Inc., Mountain View, CA (US)

(72) Inventors: Nilesh Pachpande, Mumbai (IN); Kaushal Mehta, Fremont, CA (US)

(73) Assignee: EdCast Inc., Mountain View, CA (US)

( * ) Notice: Subject to any disclaimer, the term of this patent is extended or adjusted under 35 U.S.C. 154(b) by 0 days.

(21) Appl. No.: 16/672,499

(22) Filed: Nov. 3, 2019

(65) Prior Publication Data

US 2020/0225927 A1 Jul. 16, 2020

Related U.S. Application Data

(60) Provisional application No. 62/754,585, filed on Nov. 2, 2018.

(51) Int. Cl.
*G06F 11/07* (2006.01)
*G06F 8/61* (2018.01)
(Continued)

(52) U.S. Cl.
CPC .............. *G06F 8/61* (2013.01); *G06F 40/143* (2020.01); *G06T 1/0007* (2013.01); *G06F 9/453* (2018.02);
(Continued)

(58) Field of Classification Search
CPC .......... G06F 8/61; G06F 40/143; G06F 9/453; G06F 11/07; G06F 11/36; G06F 11/079;
(Continued)

(56) References Cited

U.S. PATENT DOCUMENTS 9,130,975 B2 * 9/2015 Chou ...................... H04L 67/02
9,600,456 B2 * 3/2017 Sriganesh ............. G06F 40/143
(Continued)

OTHER PUBLICATIONS

Mathilde Caron et al., Deep Clustering for Unsupervised Learning of Visual Features, 2018, [Retrieved on Mar. 16, 2023]. Retrieved from the internet: <URL: https://openaccess.thecvf.com/content_ECCV_2018/papers/Mathilde_Caron_Deep_Clustering_for_ECCV_2018_paper.pdf> 18 Pages (1-18) (Year: 2018).*
(Continued)

*Primary Examiner* — Anibal Rivera
(74) *Attorney, Agent, or Firm* — K&L GATES LLP

(57) ABSTRACT

In one aspect, a computerized method useful for automating computer application tasks using application guides, markups and computer vision includes the step of automating a human-implemented computer task. This includes determining a human workflow via a set of images. This also includes automatically deriving the workflow based on the set of images and a set of human user inputs. The method includes the step of, based on the automated human-implemented computer task, automatically implementing a decisions on behalf of a human user. The method includes the step of, implementing the automated human-implemented computer
(Continued)

task using an in-application guide or a computer-vision step to determine a task the human user has performed and then performing the same task as the human user.

14 Claims, 13 Drawing Sheets

(51) Int. Cl.
*G06F 11/36* (2006.01)
*G06F 40/143* (2020.01)
*G06T 1/00* (2006.01)
*G06F 9/451* (2018.01)
*G06Q 30/0601* (2023.01)
*G10L 15/16* (2006.01)
*H04L 67/02* (2022.01)

(52) U.S. Cl.
CPC ............ *G06F 11/07* (2013.01); *G06F 11/079* (2013.01); *G06F 11/36* (2013.01); *G06F 11/3688* (2013.01); *G06Q 30/0625* (2013.01); *G10L 15/16* (2013.01); *H04L 67/02* (2013.01)

(58) Field of Classification Search
CPC ... G06F 11/3688; G06T 1/0007; H04L 67/02; G10L 15/16; G06N 3/0445; G06K 9/6267; G06Q 30/0625
See application file for complete search history.

(56) References Cited

U.S. PATENT DOCUMENTS

| | | | |
|---|---|---|---|
| 9,651,499 B2* | 5/2017 | Mahuna | G01N 21/8851 |
| 2013/0019149 A1* | 1/2013 | Spencer | G06F 16/951 |
| | | | 715/202 |
| 2014/0143196 A1* | 5/2014 | White | G06F 16/9537 |
| | | | 706/46 |
| 2014/0237352 A1* | 8/2014 | Sriganesh | G06F 40/143 |
| | | | 715/234 |
| 2015/0262255 A1* | 9/2015 | Khajehnouri | G06Q 30/0276 |
| | | | 705/14.66 |
| 2018/0127000 A1* | 5/2018 | Jiang | G06N 20/00 |
| 2018/0260759 A1* | 9/2018 | Bencke | G06T 7/10 |
| 2018/0276727 A1* | 9/2018 | Patel | G06Q 30/0603 |
| 2019/0005021 A1* | 1/2019 | Miller | G10L 15/26 |
| 2019/0243883 A1* | 8/2019 | Vangen | H04L 67/02 |
| 2020/0050983 A1* | 2/2020 | Balasubramanian | G06F 40/30 |
| 2020/0193463 A1* | 6/2020 | Cella | G05D 1/0088 |
| 2021/0390011 A1* | 12/2021 | Cser | G06F 9/451 |

OTHER PUBLICATIONS

Joris Ijsselmuiden et al., Towards High-Level Human Activity Recognition through Computer Vision and Temporal Logic, 2010, [Retrieved on Jul. 30, 2024]. Retrieved from the internet: <URL: https://www.researchgate.net/profile/Joris-Ijsselmuiden/publication/221561948_Towards_High> 10 Pages (426-435) (Year: 2010).*

* cited by examiner

502

506

METHODS AND SYSTEMS FOR AUTOMATING COMPUTER APPLICATION TASKS USING APPLICATION GUIDES, MARKUPS AND COMPUTER VISION

CROSS-REFERENCE TO RELATED APPLICATIONS

This application is a claims priority, to U.S. provisional patent application No. 62/754,585, titled METHODS AND SYSTEMS FOR AUTOMATING COMPUTER APPLICATION TASKS USING APPLICATION GUIDES, MARKUPS AND COMPUTER VISION and filed on 2 Nov. 2018. This provisional application is hereby incorporated by reference in its entirety.

BACKGROUND

There is a need to enable any human computer task to be automated simply by observing human workflow via a set of images and deriving the workflow based on images and human inputs. Accordingly, improvements to ability to fully or partially automate human computer tasks and take decisions on behalf of the human are desired.

SUMMARY OF THE INVENTION

In one aspect, a computerized method useful for automating computer application tasks using application guides, markups and computer vision includes the step of automating a human-implemented computer task. This includes determining a human workflow via a set of images. This also includes automatically deriving the workflow based on the set of images and a set of human user inputs. The method includes the step of, based on the automated human-implemented computer task, automatically implementing a decisions on behalf of a human user. The method includes the step of, implementing the automated human-implemented computer task using an in-application guide or a computer-vision step to determine a task the human user has performed and then performing the same task as the human user.

Figure 1:
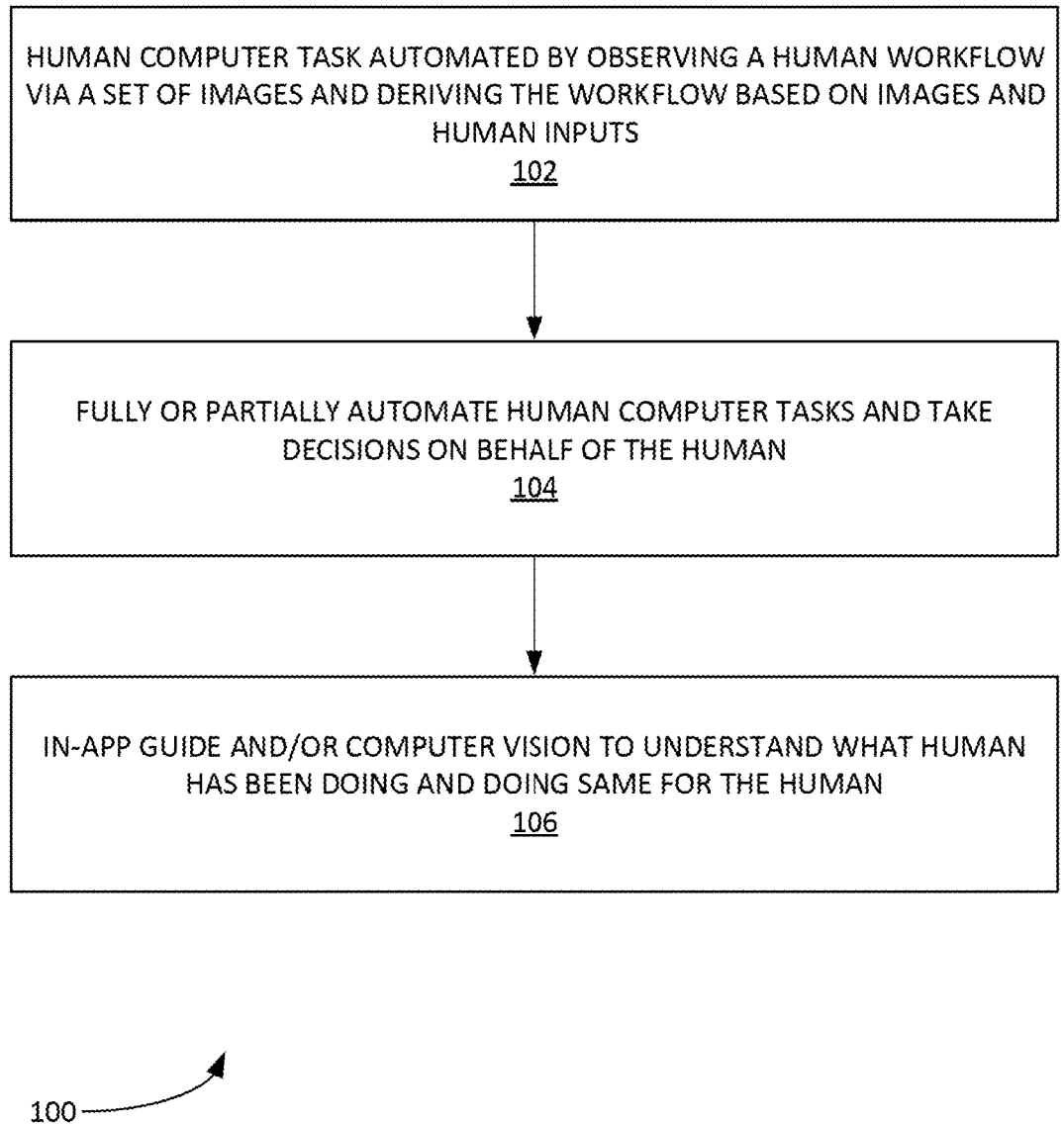
FIG. 1 illustrates an example process for automating computer application tasks using application guides, markups and computer vision, according to some embodiments.

The Figures described above are a representative set and are not an exhaustive with respect to embodying the invention.

DESCRIPTION

Disclosed are a system, method, and article of automating computer application tasks using application guides, markups and computer vision. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

Computer vision is an interdisciplinary field that deals with how computers can be made to gain high-level understanding from digital images or videos. Computer vision tasks can include methods for acquiring, processing, analyzing and understanding digital images, and extraction of high-dimensional data from the real world in order to produce numerical or symbolic information (e.g., in the forms of decisions, etc.).

Document Object Model (DOM) is a cross-platform and language-independent application programming interface that treats an HTML, XHTML, or XML document as a tree structure where in each node is an object representing a part of the document. The DOM model represents a document with a logical tree. Each branch of the tree ends in a node, and each node contains objects. DOM methods allow programmatic access to the tree; with them you can change the document's structure, style or content. Nodes can have event handlers attached to them. Once an event is triggered, the event handlers get executed.

Hypertext Markup Language (HTML) is the standard markup language for creating web pages and web applications.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Exemplary Methods and Screenshots

Computer software tasks can include simple tasks (e.g. downloading W-2 for income tax reporting, etc.) and/or complex tasks (e.g. reporting expenses at the end of a business trip and getting approval from a manager, etc.). The tasks can be daily tasks (e.g. reporting working time at the end of a work day, etc.) and/or once a year tasks (e.g. setting up medical preferences at the medical election time, etc.). The tasks can start and end in one application and/or start in-app application and continue on to another application. Tasks can also start in an application installed on a desktop computer and end in a hand-held computer.

FIG. 1 illustrates an example process 100 for automating computer application tasks using application guides, markups and computer vision, according to some embodiments. In step 102, a human computer task can be automated by observing a human workflow via a set of images and deriving the workflow based on images and human inputs. In step 104, process 100 can fully or partially automate human computer tasks and take decisions on behalf of the human. Step 104 enables a computer to perform same task as a human user and take decision based on human provided intelligence at task creation time. In step 106, process 100 implements the automation relies upon an in-app guide and/or computer vision to understand what human has been doing and doing same for the human.

By leveraging process 100, a computer can implement the following example processes.

download a W-2 report when instructed to do so by human (e.g. by observing how one human has done, same task can be done for another human user);

complete an expense report task simply by reading an image consisting of a restaurant bill (by observing how one human does expense reporting same tasks can be done for another human);

perform a business task like book a hotel or book a flight ticket based on given instructions and decision criteria; etc.

Figure 2:
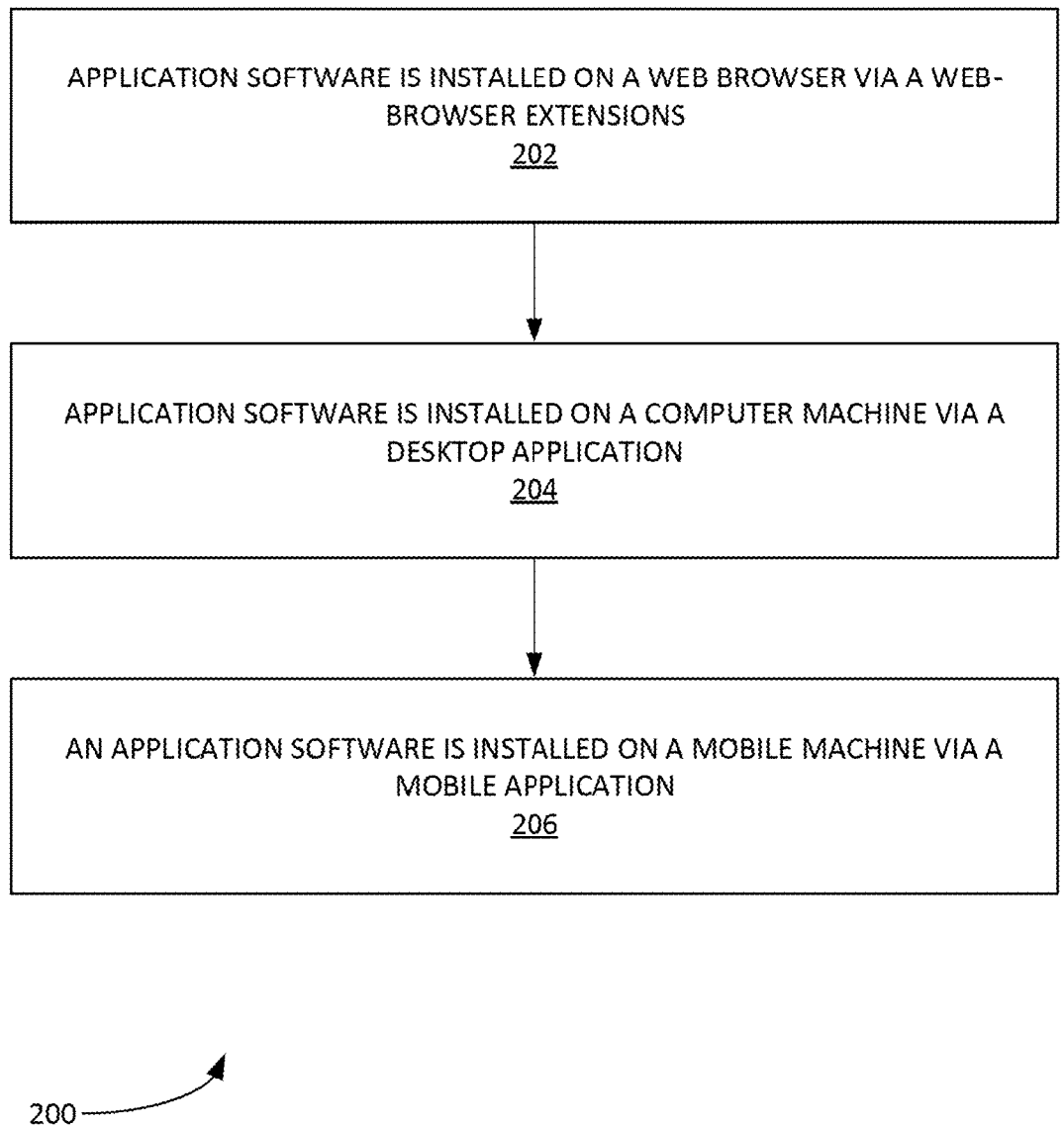
FIG. 2 provides another example process for automating computer application tasks using application guides, markups and computer vision, according to some embodiments.
Figure 3A:
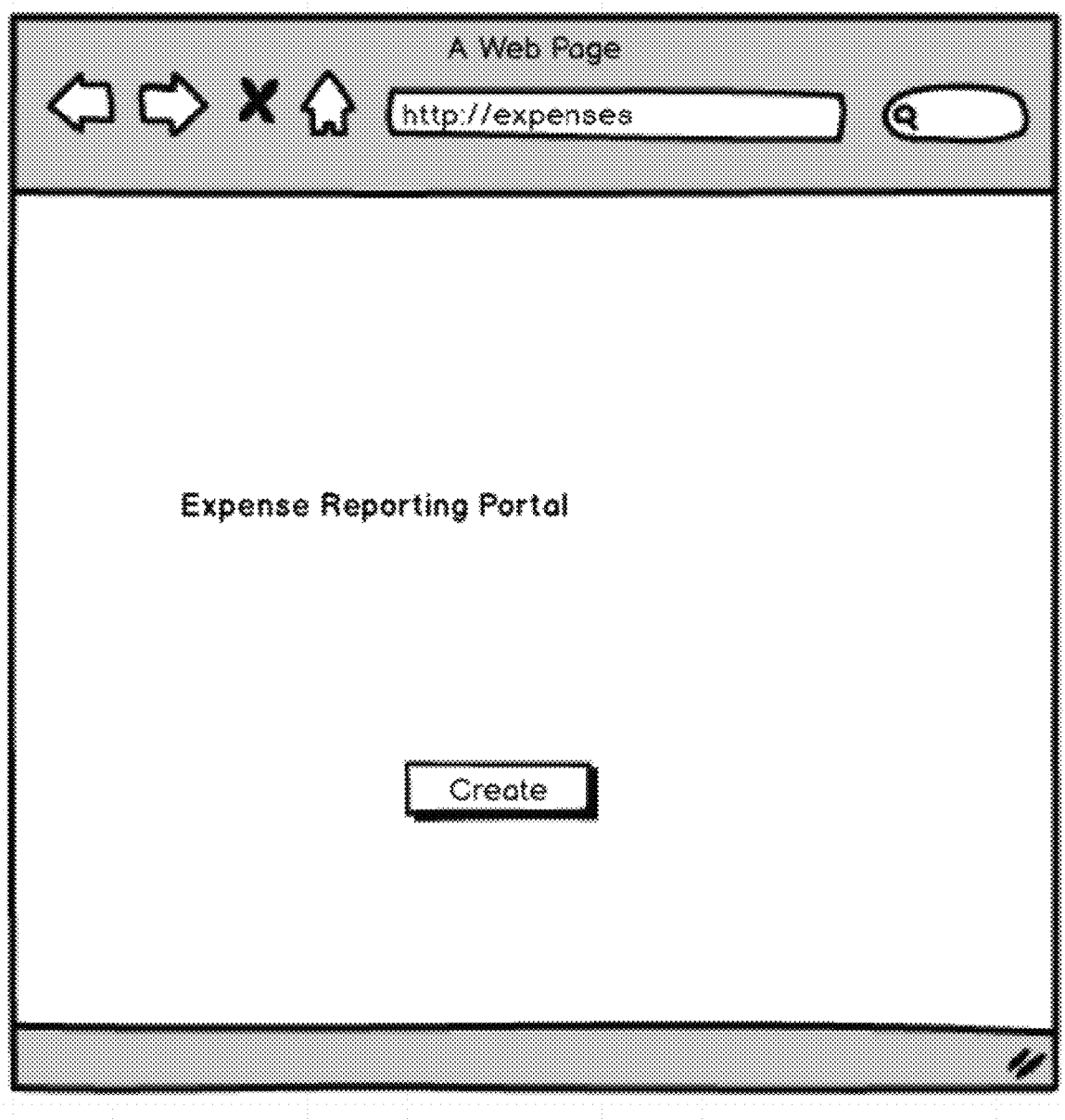
FIGS. 3 A-F illustrate an example process for expense reporting inside a web browser via screenshots, according to some embodiments.
Figure 3B:
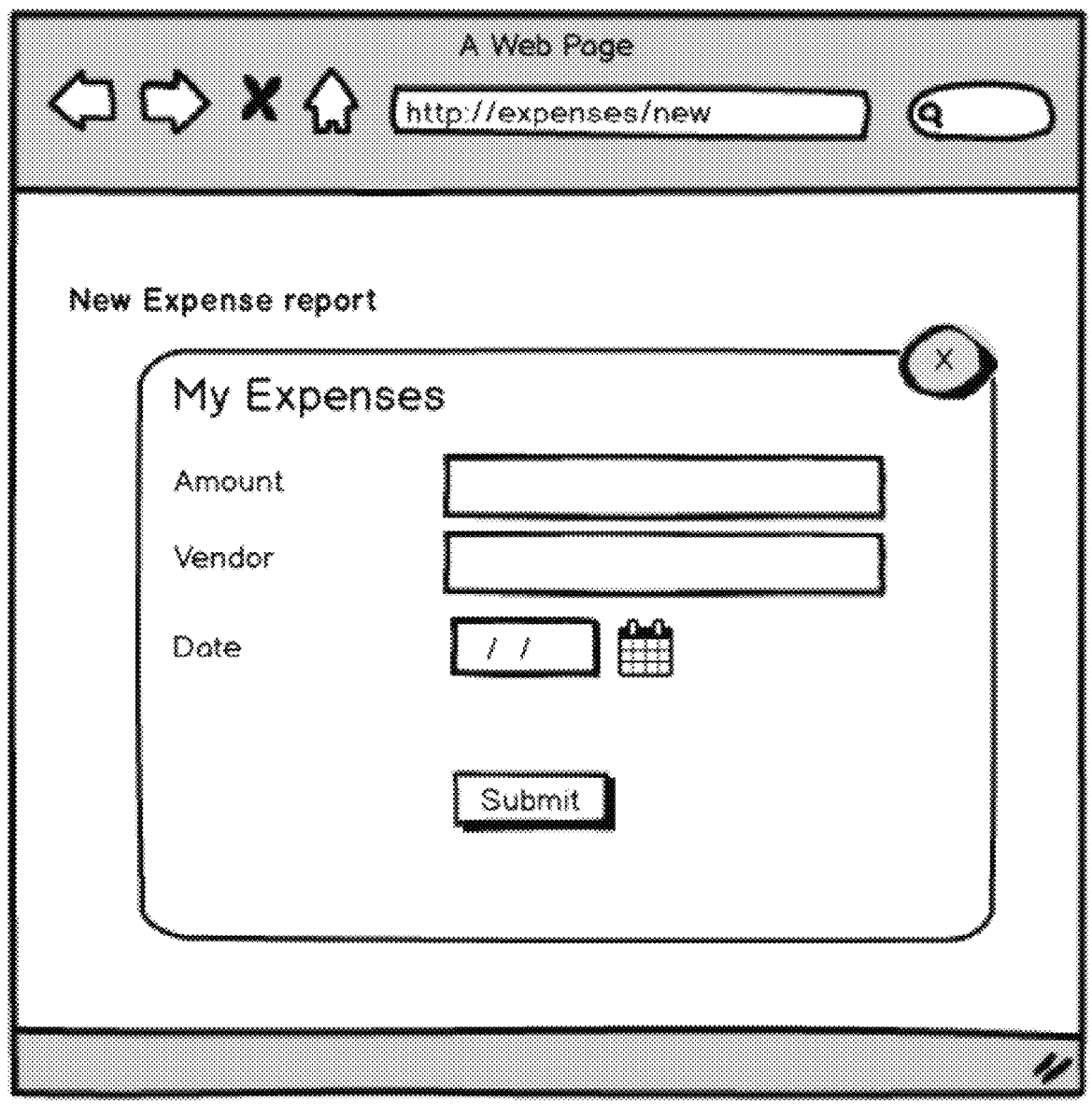
Figure 3C:
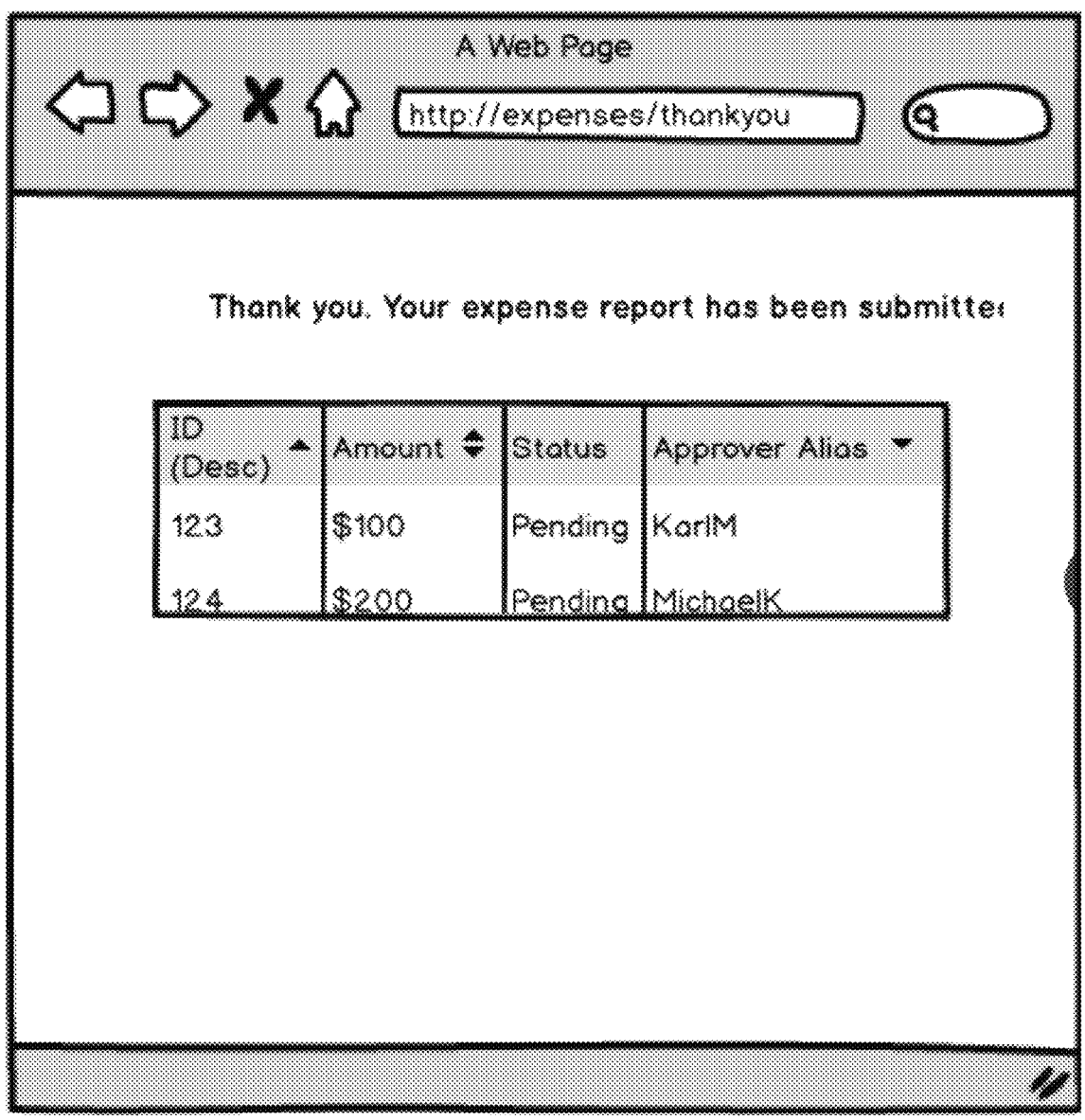
Figure 3D:
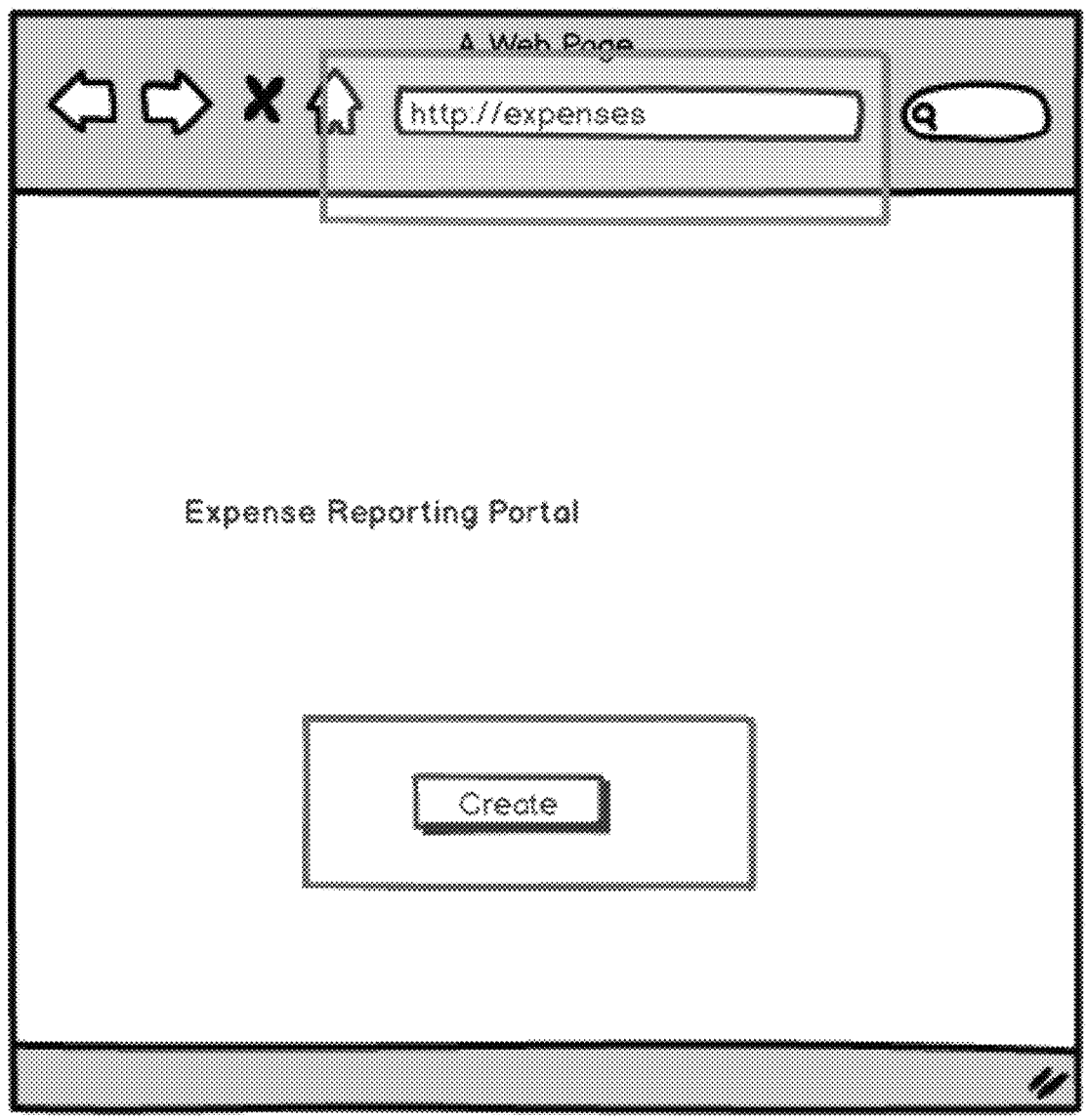
Figure 3E:
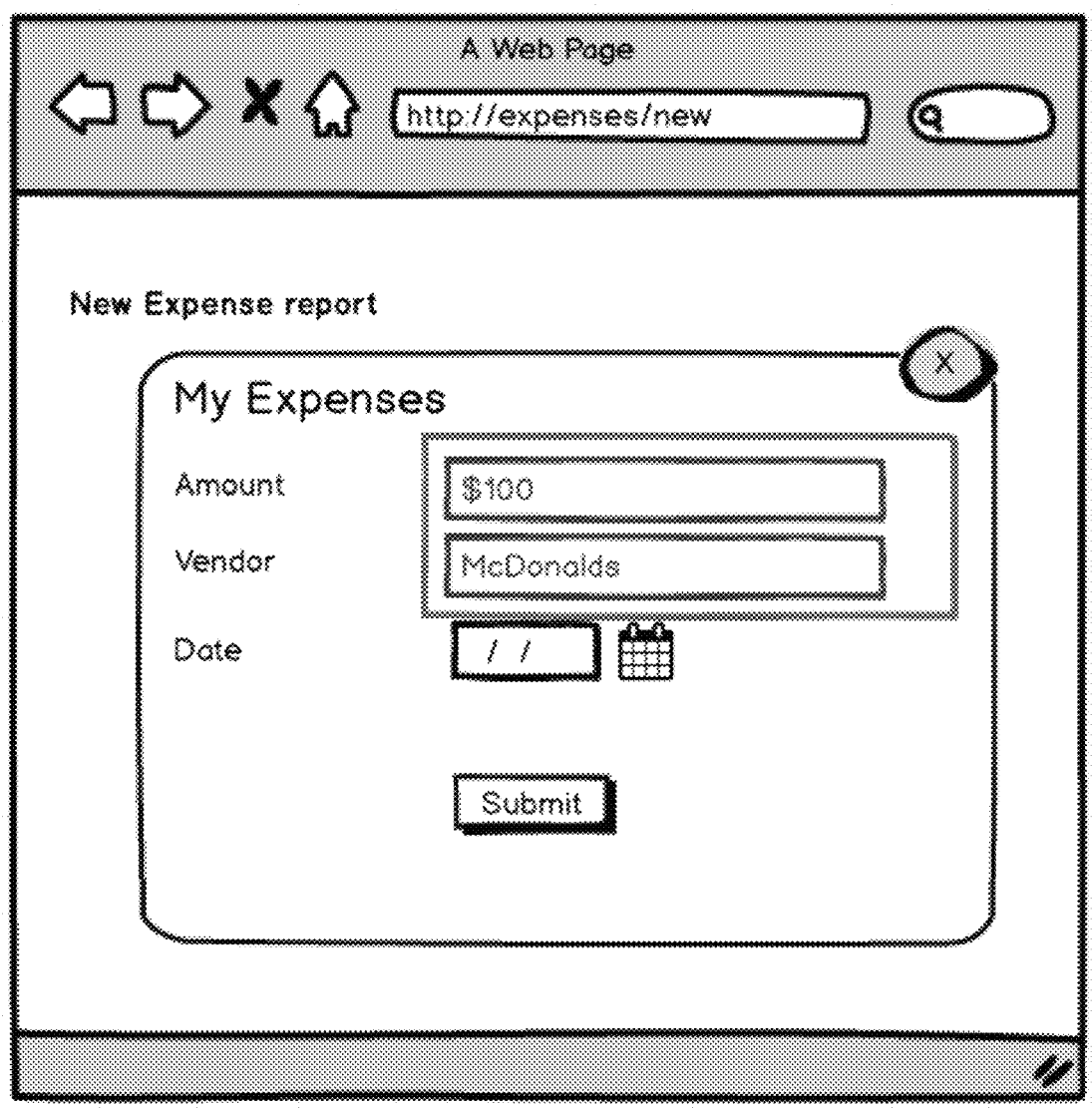
Figure 3F:
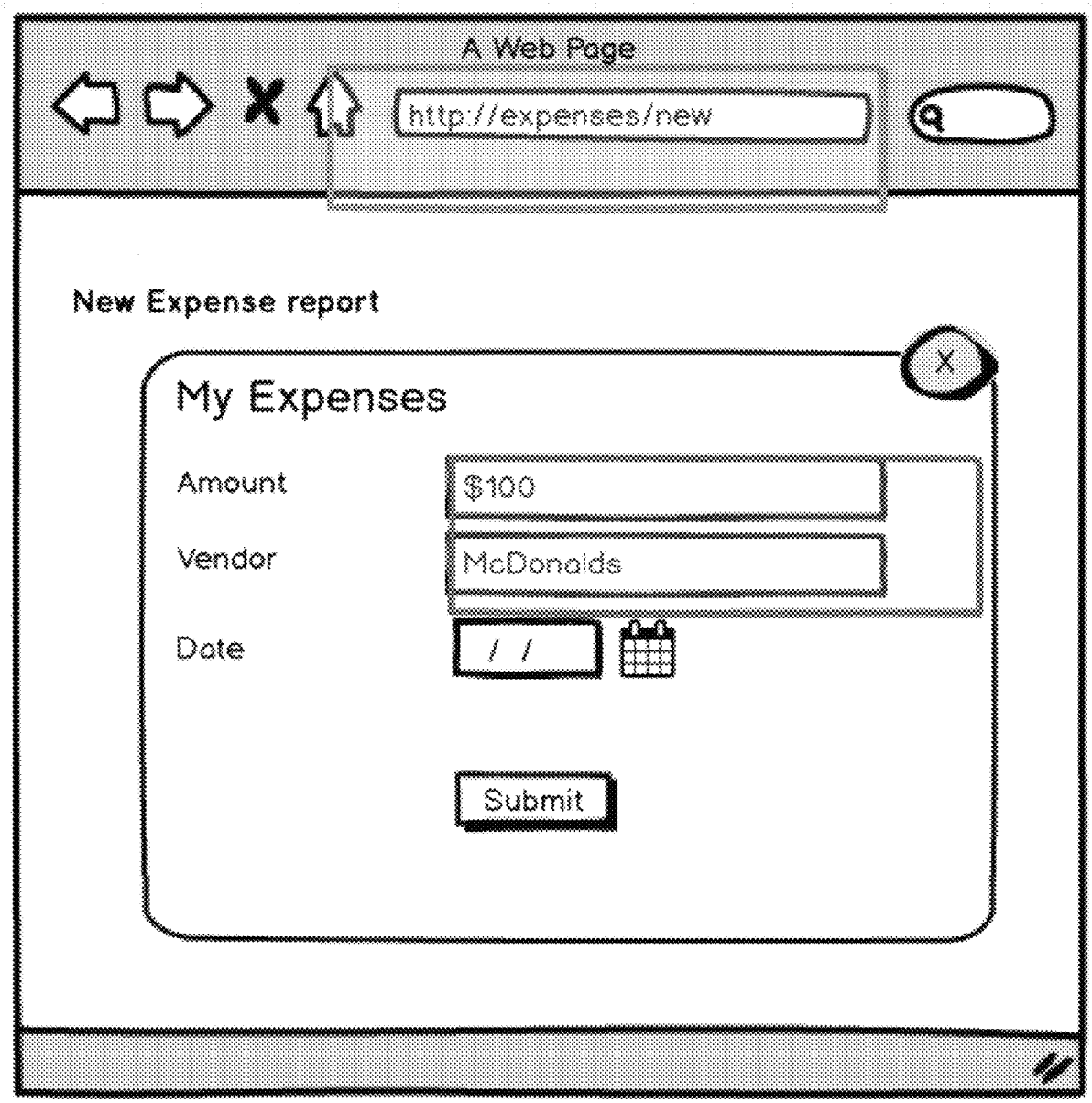

FIG. 2 provides another example process 200 for automating computer application tasks using application guides, markups and computer vision, according to some embodiments. In step 202, an application software is installed on a web browser via a web-browser extensions. The application software has ability to record a software workflow when instructed to do by human user based on start and end actions. Mouse click results in capture of underlying screen along with necessary background information (e.g. Document Object Model and/or associated HTML elements in case of web browser)

In step 204, an application software is installed on a computer machine via a desktop application. The application software has the ability to record a software workflow when instructed to do by human user based on start and end actions and/or record an underlying API response from underlying operating system (e.g. current windows, current application in focus, current screen in focus, etc.).

In step 206, an application software is installed on a mobile machine via a mobile application. The application software has the ability to record a software workflow when instructed to do by a human user based on start and end actions and/or record every underlying API response from underlying operating system (e.g. current windows, current application in focus, current screen in focus, etc.).

FIGS. 3 A-F illustrate an example process 300 for expense reporting inside a web browser via screenshots 302-312, according to some embodiments. An application installed on computer can be instructed to record every screen where a specific mouse action like click or enter is detected. More specifically, an application installed on a user's computer can be instructed to record every screen where a specific mouse action like click or enter operation is detected. By capturing and analyzing a set of screenshots 302-306, a workflow can be created which tell computer-application automator as to how to report an expense given a set of input signals (e.g. date, amount and vendor).

The automator can review at each image and identify how to return back to same screen using a set of repeated input elements as documents in screen shots 308. To start an expense reporting transaction automator uses a URL (e.g. identified in pink above via http://expenses), a label (identified in yellow above 'Expense reporting Portal') and click on a button 'Create' (identified in red rectangle). The signal to teach the computer system can be given explicitly by human (via in-app guides) and/or derived by reviewing images from a specified number of such transactions where triggering event has happened (e.g. click of a mouse). Computer vision can further be used to understand text behind buttons and gather further meta data about application (e.g. using browser HTML elements, API responses from WIn32 applications, etc.). The automator can further implement the tasks on behalf of the human by reading input signals from an input device (e.g. human can speak "Report my expenses for $100 for McDonalds on Aug. 24, 2018") and the automator can understand and can execute human tasks via a set of screens.

Screen shot 312 shows the user to communicate that transaction has been completed. A report can be sent to the human user as well. By reviewing at URL and label on the screen, the automator can determine whether it has reached its goal and/or if further human help is needed.

Figure 4:
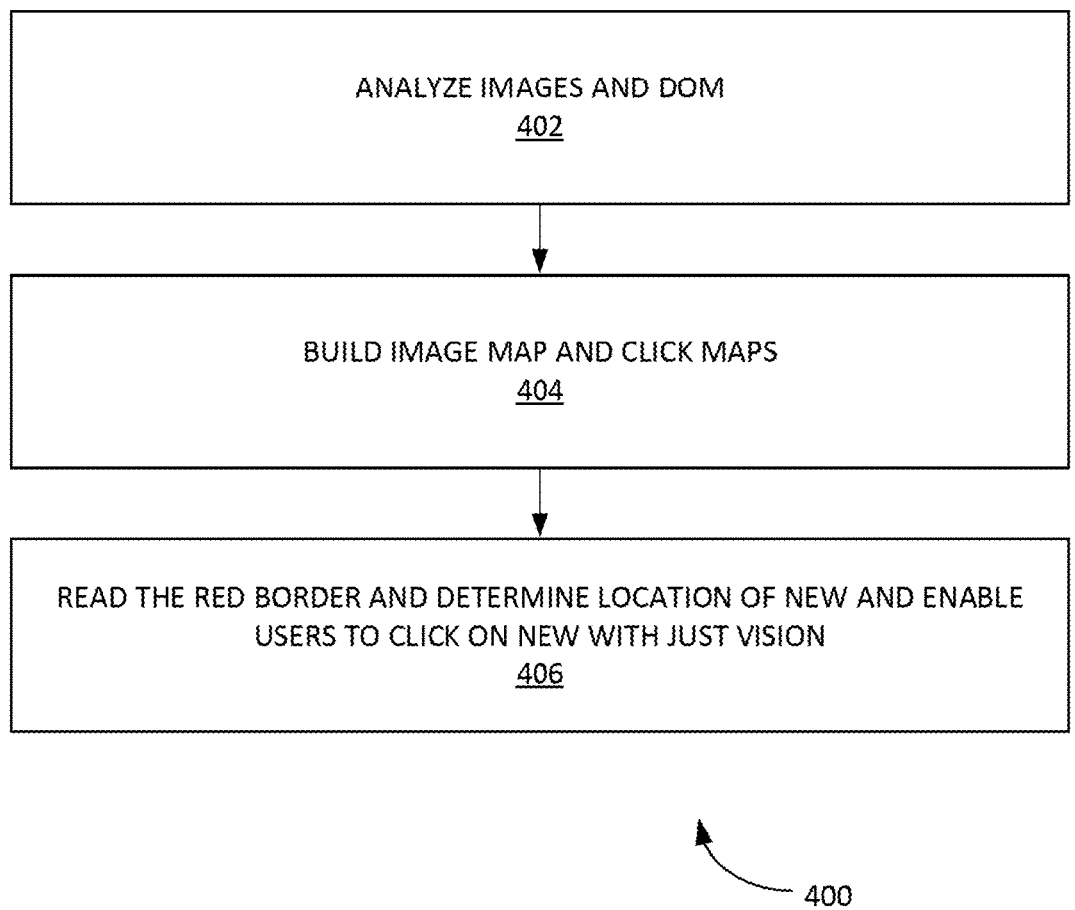
FIG. 4 illustrates an example process for computer vision for task automation, according to some embodiments.

FIG. 4 illustrates an example process 400 for computer vision for task automation, according to some embodiments. Process 400 can leverage the relevant DOM and images. In step 402, process 400 can analyze images and DOM. In step 404, process 400 can build image map and click maps. In step 406, process 400 can read the red border (e.g. see FIGS. 5 A-C) and determine location of new and enable users to click on new with just vision.

Figure 5A:
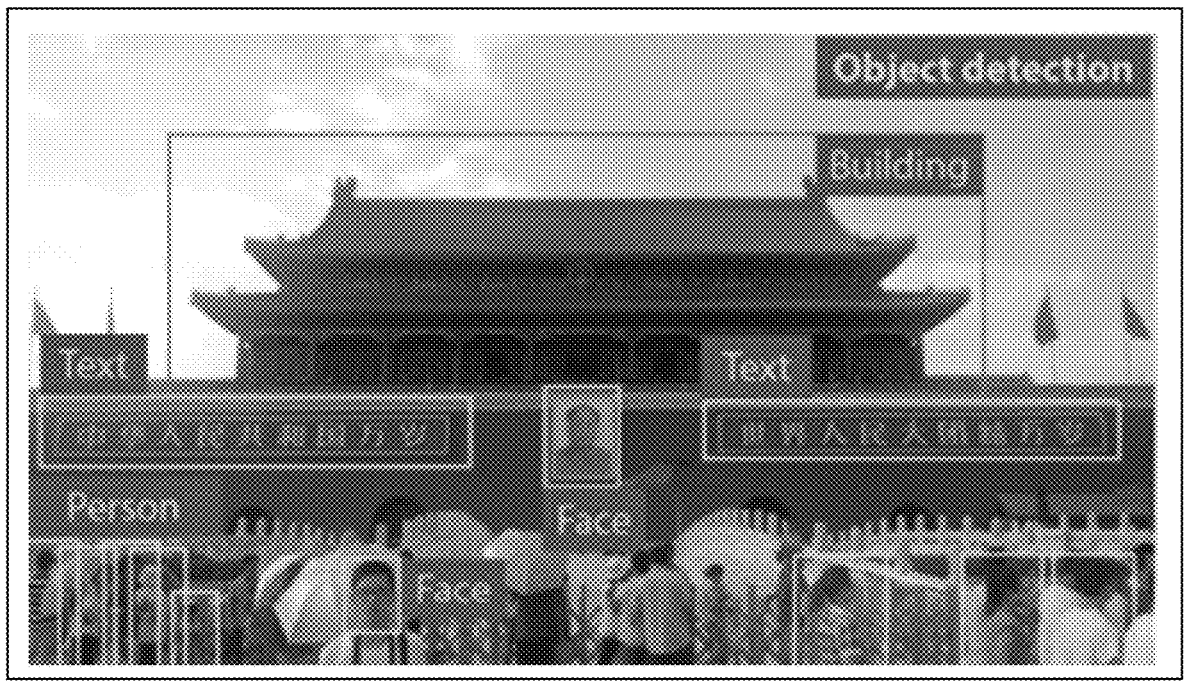
FIGS. 5 A-C illustrates an example set of screen shots for an implementation of process 400, according to some embodiments.
Figure 5B:
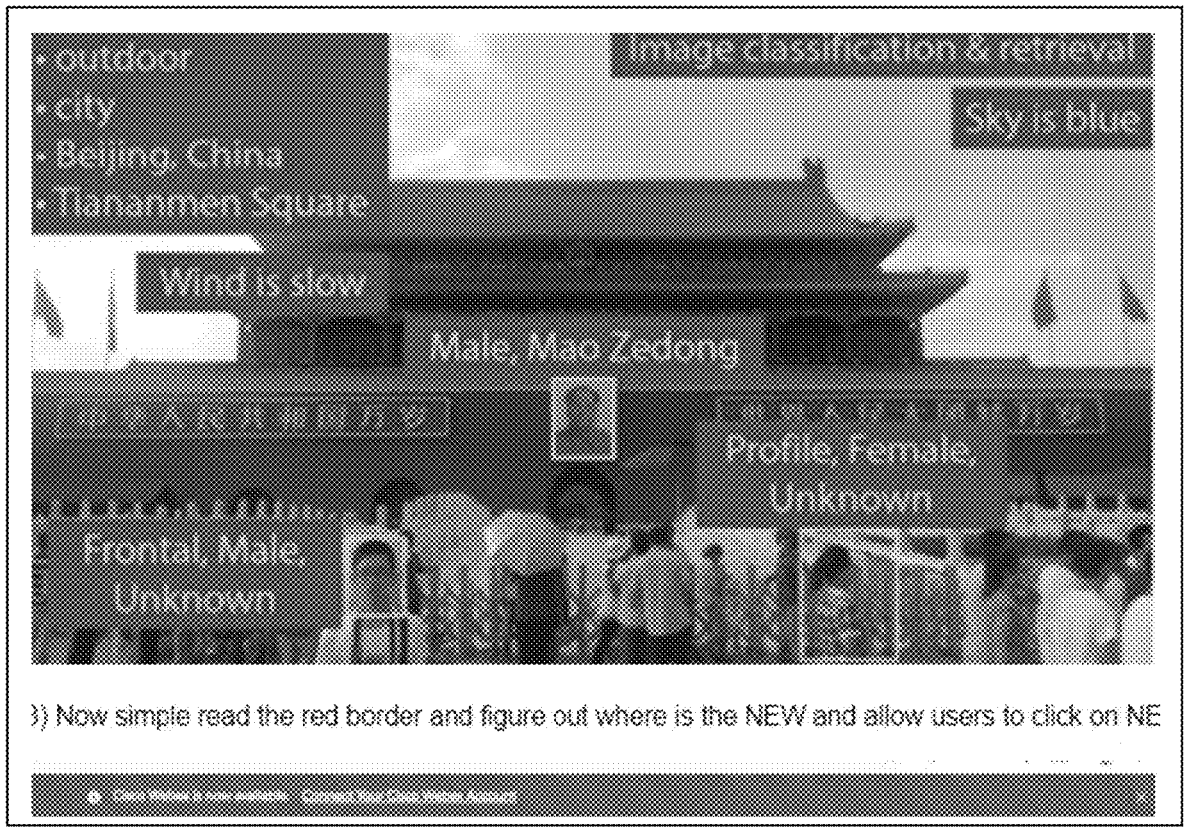
Figure 5C:
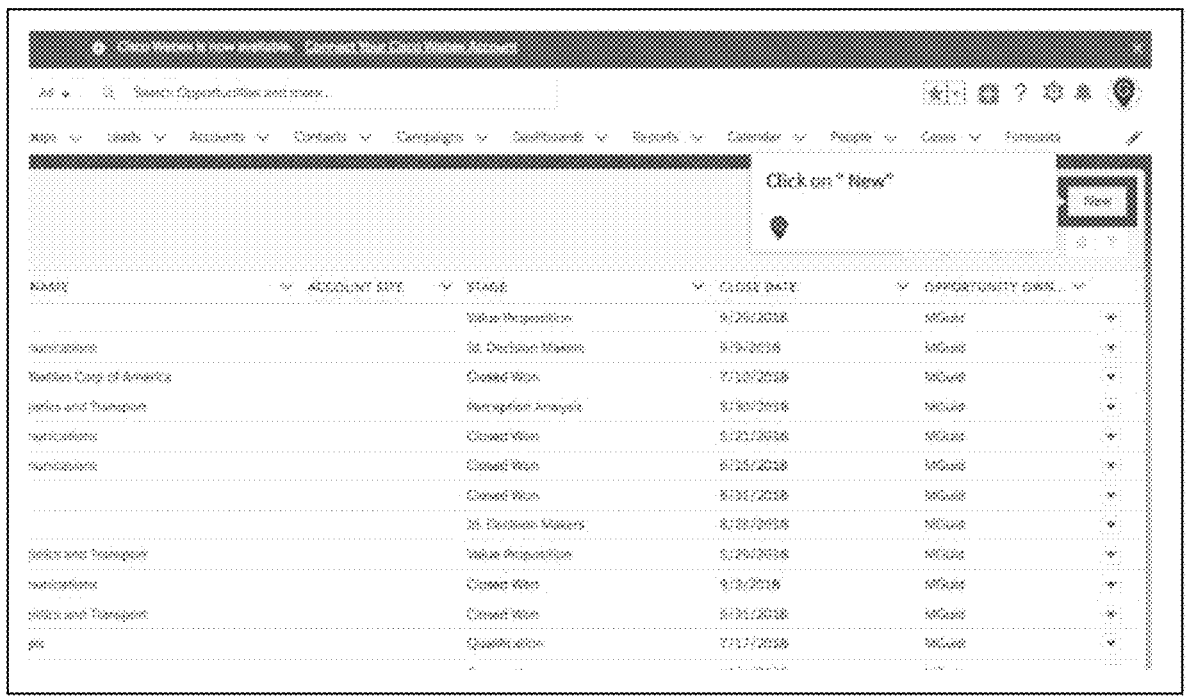

FIGS. 5 A-C illustrates an example set of screen shots 502-506 for an implementation of process 400, according to some embodiments. The processes used herein use both DOM (HTML element like classid, divid, etc.) and images. The processes provided herein leverage both DOM and computer vision to make progress.

Example Systems

Figure 6:
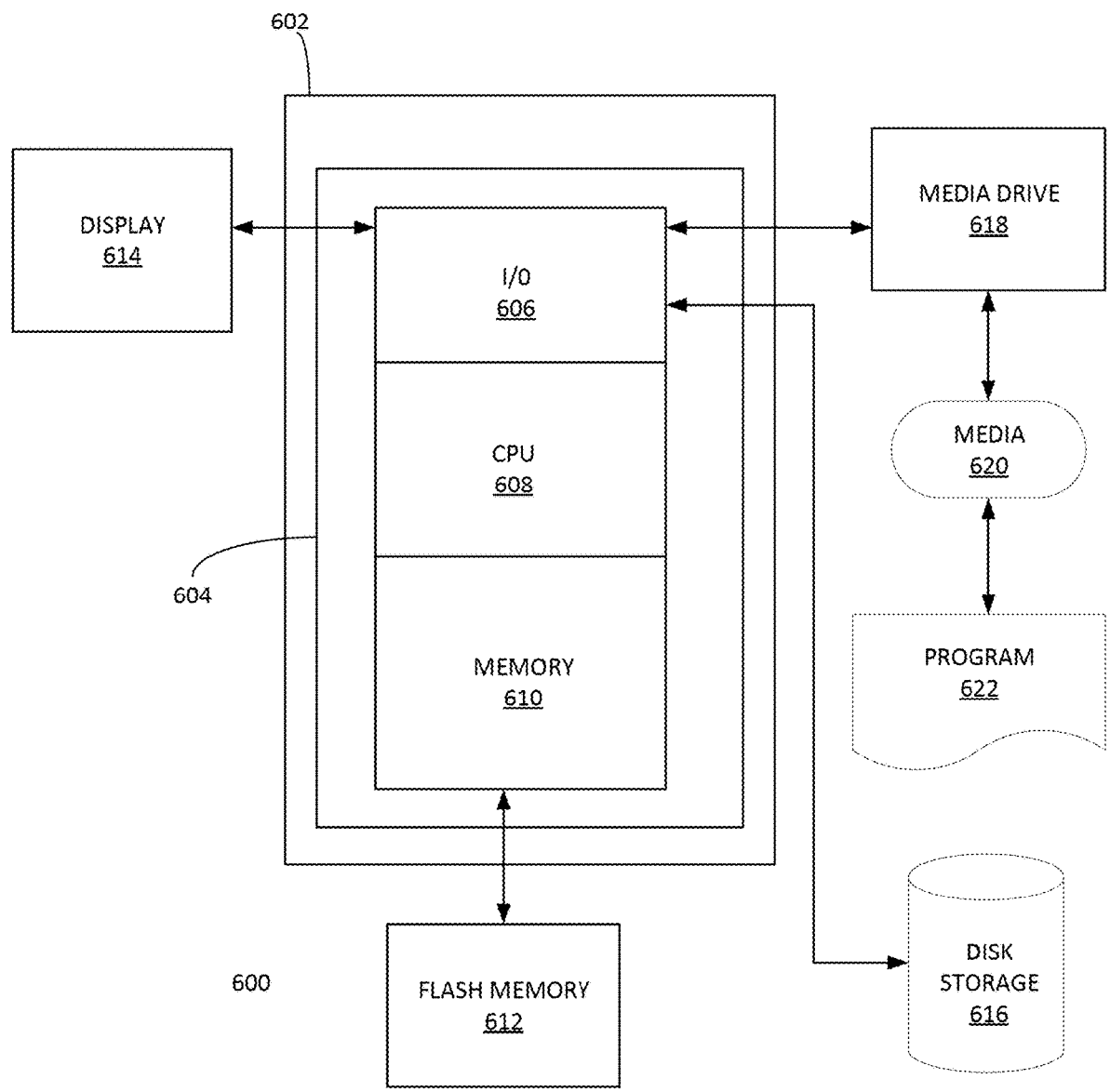
FIG. 6 depicts an exemplary computing system that can be configured to perform any one of the processes provided herein.

FIG. 6 depicts an exemplary computing system 600 that can be configured to perform any one of the processes provided herein. In this context, computing system 600 may include, for example, a processor, memory, storage, and I/O devices (e.g., monitor, keyboard, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform any of the processes described herein. The main system 602 includes a motherboard 604 having an I/O section 606, one or more central processing units (CPU) 608, and a memory section 610, which may have a flash memory card 612 related to it. The I/O section 606 can be connected to a display 614, a keyboard and/or other user input (not shown), a disk storage unit 616, and a media drive unit 618. The media drive unit 618 can read/write a computer-readable medium 620, which can contain programs 622 and/or data. Computing system 600 can include a web browser. Moreover, it is noted that computing system 600 can be configured to include additional systems in order to fulfill various functionalities. Computing system 600 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method useful for automating computer application tasks using application guides, markups and computer vision comprising:
   automating a human-implemented computer task by:
      installing an application software on a web browser via at least one web-browser extension, wherein the application software records a software workflow when instructed by the human user based on a start action and an end action and records one or more API responses from an operating system;
      determining a human workflow via a set of images;
      deriving a signal to teach a computer system by reviewing images from a specified number of transactions wherein a triggering event has happened; and
      automatically deriving the human workflow based on the set of images and a set of human user inputs and an Application Program Interface (API) response from the operating system, wherein the API response identifies one or more of a current window, a current application in focus, and a current screen in focus;
   based on the automated human-implemented computer task, automatically implementing a decision on behalf of a human user; and
   implementing the automated human-implemented computer task using an in-application guide or a computer-vision step to determine a task the human user has performed and then performing the same task as the human user, wherein the transaction is one or more of expense reporting or performing a business task based on instructions and decision criteria.

2. The computerized method of claim 1, wherein the computer-vision step comprises using a computer vision system to understand a set of text behind a set of buttons and gather further meta data about the current application in focus, wherein the set of text comprises a Hypertext Markup Language (HTML) element of the set of buttons and an API response of the set of buttons.

3. The computerized method of claim 2, further comprising:
   wherein a mouse click results in a capture of an underlying screen and a specified background information, wherein a record of every screen where the mouse click is detected is used to capture a set of screenshots to create the software workflow.

4. The computerized method of claim 3, wherein a computer automatically implements the decision on behalf of the human user to perform a same task as the human user and take a decision based on human user-provided intelligence at a specified task creation time.

5. The computerized method of claim 3, further comprising installing an application software on a mobile machine via a mobile application.

6. The computerized method of claim 5, wherein the application software records a software workflow of the current window, the current screen in focus and the current application in focus when instructed by the human user based on a start action and end action or a record of the API response.

7. The computerized method of claim 5, wherein the specified background information comprises a Document Object Model of a webpage accessed by the web browser, and wherein the specified background information comprises an associated HTML element in the web browser.

8. The computerized method of claim 1, wherein the human-implemented computer task is started in an application installed on a first computer, wherein the task ends on a second computer.

9. A computer system useful for automating computer application tasks using application guides, markups and computer vision comprising:
a processor;
an operating system, the operating system executing on the processor;
a memory containing instructions when executed on the processor, causes the processor to perform operations that:
automate a human-implemented computer task by:
installing an application software on a web browser via at least one web-browser extension;
recording a software workflow by recording every screen wherein a triggering event is detected when instructed to do based on start and end actions of the workflow, including recording one or more Application Program Interface (API) responses from the operating system;
determining a human workflow via a set of images;
deriving a signal to teach a computer system by reviewing images from a specified number of transactions wherein a triggering event has happened; and
automatically deriving the human workflow based on the set of images and a set of human user inputs and the API response from the operating system, wherein the API response identifies one or more of a current window, a current application in focus, and a current screen in focus;
based on the automated human-implemented computer task, automatically implementing a decision on behalf of a human user; and
implementing the automated human-implemented computer task using an in-application guide or a computer-vision step to determine a task the human user has performed and then performing the same task as the human user, wherein the transaction is one or more of expense reporting or performing a business task based on instructions and decision criteria.

10. The computer system of claim 9, wherein the computer-vision step comprising comprises using a computer vision system to understand a set of text behind a set of buttons and gather further meta data about the current application in focus, wherein the set of text comprises a Hypertext Markup Language (HTML) element of the set of buttons and an API response of the set of buttons, wherein the transaction is expense reporting.

11. The computer system of claim 10, wherein a mouse click results in a capture of an underlying screen and a specified background information, wherein a record of every screen where the mouse click is detected is used to capture a set of screenshots to create the software workflow;
wherein a computer automatically implement the decision on behalf of the human user to perform a same task as the human user and take a decision based on human user-provided intelligence at a specified task creation time, installing the application software on a mobile machine via a mobile application, installing the application software on a computer machine via a desktop application.

12. The computer system of claim 11, wherein the application software records a software workflow of the current window, the current screen in focus and the current application in focus when instructed by the human user based on the start action and the end action or the API response.

13. The computer system of claim 12, wherein the specified background information comprises a Document Object Model of a webpage accessed by the web browser, and wherein the specified background information comprises an associated HTML element in the web browser.

14. The computer system of claim 9, wherein the human-implemented computer task is started in an application installed on a first computer, wherein the task ends on a second computer.

* * * * *